United States Patent
Zhuang et al.

(10) Patent No.: US 10,680,900 B2
(45) Date of Patent: *Jun. 9, 2020

(54) BGP LOGICAL TOPOLOGY GENERATION METHOD, AND DEVICE

(71) Applicant: HUAWEI TECHNOLOGIES CO., LTD., Shenzhen, Guangdong (CN)

(72) Inventors: Shunwan Zhuang, Beijing (CN); Yuanbin Yin, Beijing (CN); Baohua Song, Beijing (CN); Jianbin Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,368

(22) Filed: May 9, 2019

(65) Prior Publication Data

US 2019/0268239 A1 Aug. 29, 2019

Related U.S. Application Data

(63) Continuation of application No. 15/416,518, filed on Jan. 26, 2017, now Pat. No. 10,326,664, which is a (Continued)

(30) Foreign Application Priority Data

Jul. 31, 2014 (CN) .......................... 2014 1 0374741

(51) Int. Cl.
  *H04L 12/24* (2006.01)
  *H04L 29/06* (2006.01)
  (Continued)

(52) U.S. Cl.
  CPC .............. *H04L 41/12* (2013.01); *H04L 12/66* (2013.01); *H04L 29/06* (2013.01); *H04L 45/02* (2013.01);
  (Continued)

(58) Field of Classification Search
  CPC ......... H04L 41/12; H04L 45/64; H04L 12/66; H04L 29/06; H04L 45/02; H04L 45/42; H04L 45/04
  See application file for complete search history.

(56) References Cited

U.S. PATENT DOCUMENTS

2012/0155319 A1* 6/2012 Gerber ................... H04W 24/08
  370/254
2012/0218936 A1* 8/2012 Fleeman ............ H04B 7/18563
  370/316
(Continued)

FOREIGN PATENT DOCUMENTS

CN 101247278 A 8/2008
CN 103067277 A 4/2013
(Continued)

OTHER PUBLICATIONS

International Search Report dated Sep. 9, 2015 in corresponding International Application No. PCT/CN2015/080425.
(Continued)

*Primary Examiner* — Ajay Cattungal
(74) *Attorney, Agent, or Firm* — Conley Rose, P.C.

(57) ABSTRACT

The present disclosure relates to the communications field, and discloses a BGP logical topology generation method, and a device. The method includes: obtaining, by a controller, node information of a first forwarder and BGP session information of the first forwarder, and obtaining node information of a second forwarder and BGP session information of the second forwarder; and generating, by the controller, a BGP logical topology between the first forwarder and the second forwarder according to the node information and the BGP session information of the first forwarder, and the node information and the BGP session information of the second forwarder that are obtained. The technical solution provided in the present invention can implement collection of a BGP
(Continued)

logical topology between forwarders by the controller, which is favorable for the controller to manage forwarders running the BGP protocol.

36 Claims, 5 Drawing Sheets

Related U.S. Application Data continuation of application No. PCT/CN2015/080425, filed on May 30, 2015.

(51) Int. Cl.
*H04L 12/715* (2013.01)
*H04L 12/717* (2013.01)
*H04L 12/66* (2006.01)
*H04L 12/751* (2013.01)

(52) U.S. Cl.
CPC .............. *H04L 45/42* (2013.01); *H04L 45/64* (2013.01); *H04L 45/04* (2013.01)

(56) References Cited

U.S. PATENT DOCUMENTS

| | | | | |
|---|---|---|---|---|
| 2012/0281539 A1* | 11/2012 | Patel | ...................... | H04L 45/026 370/241 |
| 2013/0094350 A1* | 4/2013 | Mandal | ................... | H04L 45/64 370/217 |
| 2013/0117449 A1* | 5/2013 | Hares | ...................... | H04L 45/04 709/225 |
| 2013/0124921 A1* | 5/2013 | Canini | .................. | G06F 11/008 714/33 |
| 2013/0322437 A1* | 12/2013 | Raszuk | ................... | H04L 45/04 370/389 |
| 2014/0344331 A1* | 11/2014 | Johns | ...................... | H04L 67/16 709/203 |
| 2015/0043570 A1* | 2/2015 | Filsfils | ................ | H04L 41/0813 370/351 |
| 2015/0207728 A1* | 7/2015 | Gagliano | ................ | H04L 45/44 370/254 |
| 2015/0207729 A1* | 7/2015 | Gagliano | ............ | H04L 67/2819 370/254 |
| 2015/0207818 A1* | 7/2015 | Gagliano | .............. | H04L 63/108 726/1 |
| 2015/0263899 A1* | 9/2015 | Tubaltsev | ................ | H04L 45/02 370/254 |
| 2015/0304218 A1 | 10/2015 | Wang et al. | | |

FOREIGN PATENT DOCUMENTS

| | | |
|---|---|---|
| CN | 103501236 A | 1/2014 |
| CN | 103947164 A | 7/2014 |
| EP | 2916497 A1 | 9/2015 |
| WO | WO 2014/069502 A1 | 5/2014 |

OTHER PUBLICATIONS

European Search Report dated Jun. 16, 2017 in corresponding European Application No. 15827243.5.
Lougheed, et al., "A Border Gateway Protocol (BGP)", Network Working Group, Request for Comments: 1105, Jun. 1989, pp. 1-17.
Lougheed, et al., "A Border Gateway Protocol (BGP)", Network Working Group, Request for Comments: 1163, Obsoletes: RFC 1105, Jun. 1990, pp. 1-29.
Lougheed, et al., "A Border Gateway Protocol 3 (BGP-3)", Network Working Group, Request for Comments: 1267, Obsoletes RFCs: 1105, 1163, Oct. 1991, pp. 1-35.
Rekhter, et al., "A Border Gateway Protocol 4 (BGP-4)", Network Working Group, Request for Comments: 4271, Obsoletes: 1771, Category: Standards Track, Jan. 2006, pp. 1-104.
Rosen, et al., "BGP/MPLS IP Virtual Private Networks (VPNs)", Network Working Group, Request for Comments: 4364, Obsoletes: 2547, Category: Standards Track, Feb. 2006, pp. 1-47.
Bates, et al., "BGP Route Reflection: An Alternative to Full Mesh Internal BGP (IBGP)", Network Working Group, Request for Comments: 4456, Obsoletes: 2796, 1966, Category: Standards Track, Apr. 2006, pp. 1-12.
Bates, et al., "Multiprotocol Extensions for BGP-4", Network Working Group, Request for Comments: 4760, Obsoletes: 2858, Category: Standards Track, Jan. 2007, pp. 1-12.
Scudder, et al., "Capabilities Advertisement with BGP-4", Network Working Group, Request for Comments: 5492, Obsoletes: 3392, Category: Standards Track, Feb. 2009, pp. 1-7.
Walton, et. al., "Advertisement of Multiple Paths in BGP draft-ietf-idr-add-paths-07.txt", Network Working Group, Internet Draft, Intended Status: Standards Track, Expiration Date: Dec. 18, 2012, Jun. 17, 2012, pp. 1-9.
Gredler, et al., "North-Bound Distribution of Link-State and TE Information Using BGP draft-ietf-idr-ls-distribution-04", Inter-Domain Routing, Internet-Draft, Intended status: Standards Track, Expires: May 22, 2014, Nov. 18, 2013, pp. 1-41.
Open Networking Foundation, "OpenFlow Switch Specification" Version 1.3.4 (protocol version 0x04), Mar. 27, 2014, pp. 1-171.
Chinese Office Action dated Jan. 2, 2018 in corresponding Chinese Patent Application 201410374741.6.
Office Action, dated Sep. 20, 2018, in U.S. Appl. No. 15/416,518 (24 pp.).
Notice of Allowance, dated Feb. 12, 2019, in U.S. Appl. No. 15/416,518 (8 pp.).
U.S. Appl. No. 15/416,518, filed Jan. 26, 2017, Shunwan Zhuang et al., Huawei Technologies Co., Ltd.

\* cited by examiner

US 10,680,900 B2

BGP LOGICAL TOPOLOGY GENERATION METHOD, AND DEVICE

CROSS-REFERENCE TO RELATED APPLICATIONS

This application is a continuation of U.S. patent application Ser. No. 15/416,518, filed on Jan. 26, 2017, which is a continuation of International Application No. PCT/CN2015/080425, filed on May 30, 2015. The International Application claims priority to Chinese Patent Application No. 201410374741.6, filed on Jul. 31, 2014. All of the aforementioned patent applications are hereby incorporated by reference in their entireties.

TECHNICAL FIELD

The present disclosure relates to the communications field, and in particular, to a Border Gateway Protocol (BGP) logical topology generation method, and a device.

BACKGROUND

An Autonomous System (AS) is a small-sized network, in the Internet, capable of autonomously determining a routing protocol that is used in the system. The AS system may be a simple network unit, or may be a network group including multiple network units controlled by at least one network management device.

The BGP is a routing protocol used between AS systems and is mainly used to exchange routing information between the AS systems, so that after obtaining the routing information, a controller builds a propagation path of data between the AS systems.

With unceasing maturity and development of network technologies, centralized network control becomes a future network development trend. There are two types of devices in a centralized control network: a controller (Controller) and a forwarder (Forwarder). The controller is responsible for performing centralized control on the network and delivering a forwarding entry to the forwarder, and the forwarder performs packet matching and forwarding. In the prior art, no technical solution can effectively implement collection of a BGP logical topology between forwarders by the controller, which is unfavorable for the controller to manage forwarders running the BGP protocol.

SUMMARY

Embodiments of the present invention provide a BGP logical topology generation method, and a device, so as to implement collection of a BGP logical topology between forwarders by a controller, and is favorable for the controller to manage forwarders running the BGP protocol.

To achieve the foregoing objective, the following technical solutions are used in the embodiments of the present invention:

According to a first aspect, an embodiment of the present invention provides a BGP logical topology generation method, where the method is applicable to a network system in which control and forwarding are separated, the network system includes a controller, a first forwarder, and a second forwarder, and a BGP session is established between the first forwarder and the second forwarder; and the method includes:

obtaining, by the controller, node information of the first forwarder and BGP session information of the first forwarder, where the node information of the first forwarder includes a BGP route identifier (Route-ID) of the first forwarder and an autonomous system number of an autonomous system to which the first forwarder belongs;

obtaining, by the controller, node information of the second forwarder and BGP session information of the second forwarder, where the node information of the second forwarder includes a BGP Route-ID of the second forwarder and an autonomous system number of an autonomous system to which the second forwarder belongs; and generating, by the controller, a BGP logical topology between the first forwarder and the second forwarder according to the node information of the first forwarder, the BGP session information of the first forwarder, the node information of the second forwarder, and the BGP session information of the second forwarder, where the BGP logical topology between the first forwarder and the second forwarder includes a BGP session relationship between the first forwarder and the second forwarder.

With reference to the first aspect, in a first possible implementation manner, the BGP session information of the first forwarder includes interface address information of the first forwarder for establishing a BGP session, interface address information of the second forwarder that establishes the BGP session with the first forwarder, the autonomous system number of an autonomous system to which the second forwarder belongs, and the Route-ID of the second forwarder; and the BGP session information of the second forwarder includes interface address information of the second forwarder for establishing a BGP session, interface address information of the first forwarder that establishes the BGP session with the second forwarder, the autonomous system number of an autonomous system to which the first forwarder belongs, and the Route-ID of the first forwarder.

With reference to the first possible implementation manner of the first aspect, in a second possible implementation manner, the generating, by the controller, a BGP logical topology between the first forwarder and the second forwarder according to the node information of the first forwarder, the BGP session information of the first forwarder, the node information of the second forwarder, and the BGP session information of the second forwarder includes:

when the controller determines that both the BGP session information of the first forwarder and the BGP session information of the second forwarder include the Route-ID of the second forwarder, determining that the second forwarder and the first forwarder establish a BGP session; when determining that the autonomous system number of an autonomous system to which the first forwarder belongs and the autonomous system number of an autonomous system to which the second forwarder belongs are the same, determining that a type of the BGP session established by the first forwarder and the second forwarder is an Internal Border Gateway Protocol (IBGP) session; and when determining that the autonomous system number of an autonomous system to which the first forwarder belongs and the autonomous system number of an autonomous system to which the second forwarder belongs are different, determining that the type of the BGP session established by the first forwarder and the second forwarder is an External Border Gateway Protocol (EBGP) session; and establishing, by the controller, a BGP session correspondence between the first forwarder and the second forwarder according to the node information of the first forwarder, the BGP session information of the first forwarder, the node information of the second forwarder, and the BGP session information of the second forwarder, so as to form a BGP logical topology between the first forwarder and the second forwarder.

With reference to any one of the first aspect to the second possible implementation manner of the first aspect, in a third possible implementation manner, before the obtaining, by the controller, node information of the first forwarder and BGP session information of the first forwarder, the method further includes:

establishing, by the controller, a first communication channel with the first forwarder based on the OpenFlow protocol or the Diameter protocol; and obtaining, by the controller, the node information of the first forwarder and the BGP session information of the first forwarder by means of the first communication channel.

With reference to the third possible implementation manner of the first aspect, in a fourth possible implementation manner, the first forwarder and the second forwarder belong to a same autonomous system, and the first forwarder stores the node information of the second forwarder and the BGP session information of the second forwarder; and the method further includes:

obtaining, by the controller, the node information of the second forwarder and the BGP session information of the second forwarder by means of the first communication channel that is established with the first forwarder.

With reference to any one of the first aspect to the second possible implementation manner of the first aspect, in a fifth possible implementation manner, before the obtaining, by the controller, node information of the second forwarder and BGP session information of the second forwarder, the method further includes:

establishing, by the controller, a second communication channel with the second forwarder based on the OpenFlow protocol or the Diameter protocol; and obtaining, by the controller, the node information of the second forwarder and the BGP session information of the second forwarder by means of the second communication channel.

According to a second aspect, an embodiment of the present invention provides a controller, applied to a network system in which control and forwarding are separated, where the network system includes the controller, a first forwarder, and a second forwarder, and a BGP session is established between the first forwarder and the second forwarder; and the controller includes:

an obtaining unit, configured to obtain node information of the first forwarder and BGP session information of the first forwarder, and obtain node information of the second forwarder and BGP session information of the second forwarder, where the node information of the first forwarder includes a BGP route identifier Route-ID of the first forwarder and an autonomous system number of an autonomous system to which the first forwarder belongs, and the node information of the second forwarder includes a BGP route identifier Route-ID of the second forwarder and an autonomous system number of an autonomous system to which the second forwarder belongs; and a logical topology unit, configured to generate a BGP logical topology between the first forwarder and the second forwarder according to the node information of the first forwarder, the BGP session information of the first forwarder, the node information of the second forwarder, and the BGP session information of the second forwarder that are obtained by the obtaining unit, where the BGP logical topology between the first forwarder and the second forwarder includes a BGP session relationship between the first forwarder and the second forwarder.

With reference to the second aspect, in a first possible implementation manner, the BGP session information of the first forwarder includes interface address information of the first forwarder for establishing a BGP session, interface address information of the second forwarder that establishes the BGP session with the first forwarder, the autonomous system number of an autonomous system to which the second forwarder belongs, and the Route-ID of the second forwarder; and the BGP session information of the second forwarder includes interface address information of the second forwarder for establishing a BGP session, interface address information of the first forwarder that establishes the BGP session with the second forwarder, the autonomous system number of an autonomous system to which the first forwarder belongs, and the Route-ID of the first forwarder.

With reference to the first possible implementation manner of the second aspect, in a second possible implementation manner, the logical topology unit includes a determining subunit and a connection subunit, where the determining subunit is configured to: when determining that both the BGP session information of the first forwarder and the BGP session information of the second forwarder include the Route-ID of the second forwarder, determine that the second forwarder and the first forwarder establish a BGP session; when determining that the autonomous system number of an autonomous system to which the first forwarder belongs and the autonomous system number of an autonomous system to which the second forwarder belongs are the same, determine that a type of the BGP session established by the first forwarder and the second forwarder is an IBGP session; and when determining that the autonomous system number of an autonomous system to which the first forwarder belongs and the autonomous system number of an autonomous system to which the second forwarder belongs are different, determine that the type of the BGP session established by the first forwarder and the second forwarder is an EBGP session; and the connection subunit is configured to establish a BGP session correspondence between the first forwarder and the second forwarder according to the node information of the first forwarder, the BGP session information of the first forwarder, the node information of the second forwarder, and the BGP session information of the second forwarder, so as to form a BGP logical topology between the first forwarder and the second forwarder.

With reference to any one of the second aspect to the second possible implementation manner of the second aspect, in a third possible implementation manner, the controller further includes a first communications unit;

the first communications unit is configured to establish a first communication channel with the first forwarder based on the OpenFlow protocol or the Diameter protocol; and the obtaining unit is further configured to obtain the node information of the first forwarder and the BGP session information of the first forwarder by means of the first communication channel that is established by the first communications unit.

With reference to the third possible implementation manner of the second aspect, in a fourth possible implementation manner, the first forwarder and the second forwarder belong to a same autonomous system, and the first forwarder stores the node information of the second forwarder and the BGP session information of the second forwarder; and the obtaining unit is further configured to obtain the node information of the second forwarder and the BGP session information of the second forwarder by means of the first communication channel that is established with the first forwarder.

With reference to any one of the second aspect to the second possible implementation manner of the second aspect, in a fifth possible implementation manner, the controller further includes a second communications unit;

the second communications unit is configured to establish a second communication channel with the second forwarder based on the OpenFlow protocol or the Diameter protocol; and the obtaining unit is further configured to obtain the node information of the second forwarder and the BGP session information of the second forwarder by means of the second communication channel that is established by the second communications unit.

In the BGP logical topology generation method provided in the embodiments of the present invention, by obtaining node information of a first forwarder and BGP session information of the first forwarder and obtaining node information of a second forwarder and BGP session information of the second forwarder, a BGP logical topology between the first forwarder and the second forwarder is generated. The method can implement collection of a BGP logical topology between forwarders by a controller, which is favorable for the controller to manage forwarders running the BGP protocol.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
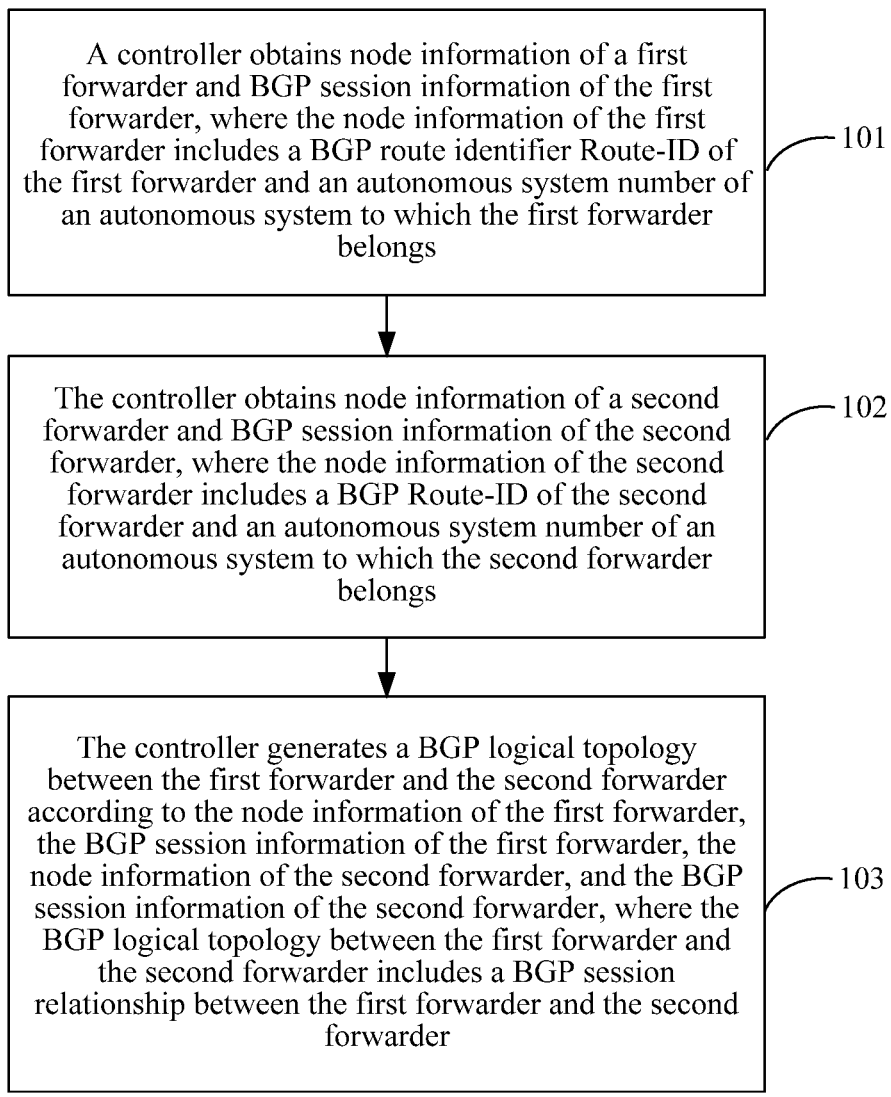
FIG. 1 is a schematic flowchart of a BGP logical topology generation method according to an embodiment of the present invention.

An embodiment of the present invention provides a BGP logical topology generation method. The method is applicable to a network system in which control and forwarding are separated. Optionally, the network system includes a controller, a first forwarder, and a second forwarder, and a BGP session is established between the first forwarder and the second forwarder. Referring to FIG. 1, the method includes the following steps.

101: The controller obtains node information of the first forwarder and BGP session information of the first forwarder, where the node information of the first forwarder includes a BGP route identifier Route-ID of the first forwarder and an autonomous system number of an autonomous system to which the first forwarder belongs.

102: The controller obtains node information of the second forwarder and BGP session information of the second forwarder, where the node information of the second forwarder includes a BGP Route-ID of the second forwarder and an autonomous system number of an autonomous system to which the second forwarder belongs.

The node information of the first forwarder includes the BGP Route-ID of the first forwarder and the autonomous system number of an autonomous system to which the first forwarder belongs, and the node information of the second forwarder includes the BGP Route-ID of the second forwarder and the autonomous system number of an autonomous system to which the second forwarder belongs.

Optionally, before the obtaining, by the controller, node information of the first forwarder and BGP session information of the first forwarder, the method further includes:

establishing, by the controller, a first communication channel with the first forwarder based on the OpenFlow protocol or the Diameter protocol; and obtaining, by the controller, the node information of the first forwarder and the BGP session information of the first forwarder by means of the first communication channel.

Optionally, before the obtaining, by the controller, node information of the second forwarder and BGP session information of the second forwarder, the method further includes:

establishing, by the controller, a second communication channel with the second forwarder based on the OpenFlow protocol or the Diameter protocol; and obtaining, by the controller, the node information of the second forwarder and the BGP session information of the second forwarder by means of the second communication channel.

Optionally, the controller establishes the first communication channel and the second communication channel in the following two manners.

Figure 2:
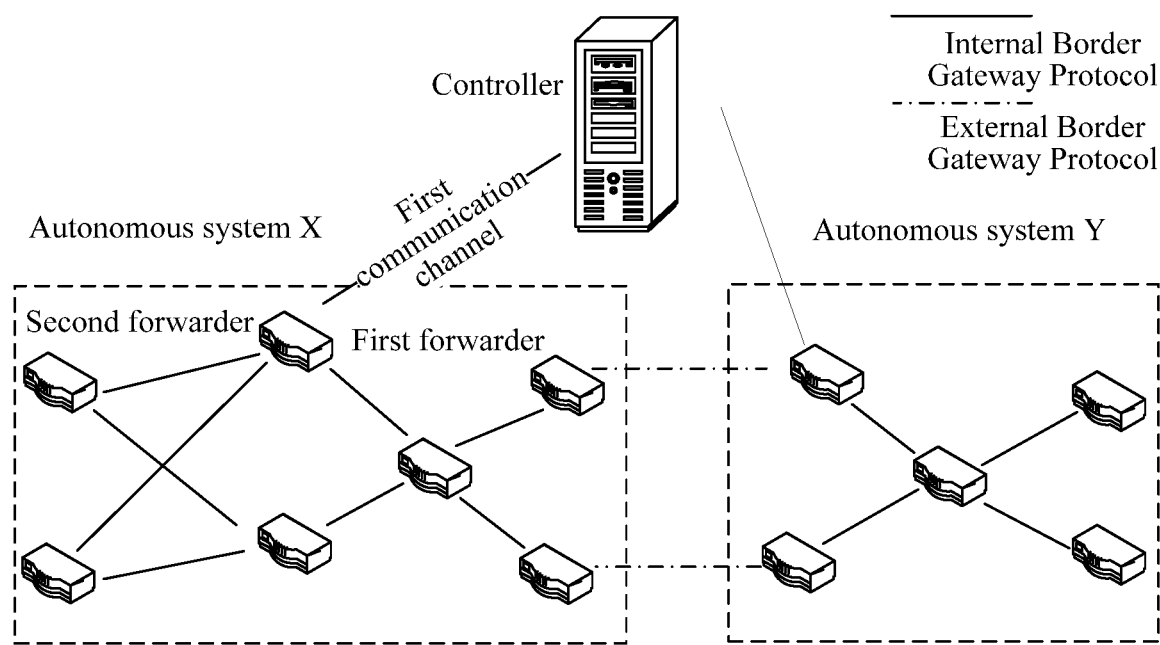
FIG. 2 is a schematic structural diagram of a network system according to an embodiment of the present invention.

A first manner: referring to FIG. 2, a network system in FIG. 2 includes two areas. Certainly, the two areas are used as an example herein for description. However, it does not indicate that the network system in this embodiment can include only two areas. A first area belongs to an autonomous system X, and a second area belongs to an autonomous system Y. In a same autonomous system, the IBGP is used for data transmission between forwarders. Between different autonomous systems, as shown in FIG. 2, between the autonomous system X and the autonomous system Y, the EBGP is used for data transmission between nodes. In the network system shown in FIG. 2, a first forwarder and a second forwarder both belong to the autonomous system X. The first forwarder stores node information of the second forwarder and BGP session information of the second forwarder. The controller establishes a first communication channel with the first forwarder based on the OpenFlow protocol or the Diameter protocol. The controller obtains node information of the first forwarder and BGP session information of the first forwarder by means of the first communication channel, and obtains the node information of the second forwarder and the BGP session information of the second forwarder by means of the first communication channel.

Figure 3:
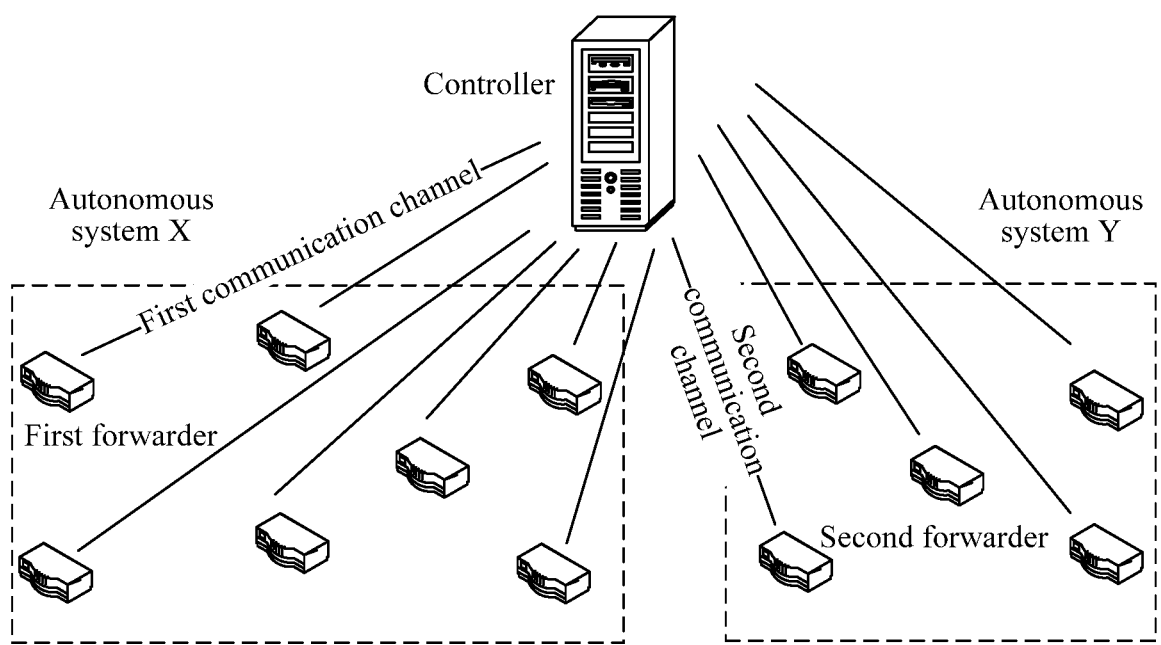
FIG. 3 is a schematic structural diagram of another network system according to an embodiment of the present invention.

A second manner: referring to FIG. 3, a network system in FIG. 3 includes a first autonomous system and a second autonomous system. A first forwarder belongs to an autonomous system X, and a second forwarder belongs to an autonomous system Y. The controller establishes a first communication channel with the first forwarder based on the OpenFlow protocol or the Diameter protocol. The controller obtains node information of the first forwarder and BGP session information of the first forwarder by means of the first communication channel. The controller establishes a second communication channel with the second forwarder based on the OpenFlow protocol or the Diameter protocol. The controller obtains node information of the second forwarder and BGP session information of the second forwarder by means of the second communication channel.

Certainly, like application scenarios shown in FIG. 2 and FIG. 3, there may be multiple forwarders in a network system. This is not limited in the present invention.

Optionally, in an application scenario, node information of a first forwarder and node information of a second forwarder may further include a protocol type identifier. The protocol type identifier is used to indicate a protocol that is used when the forwarder performs data transmission.

Further optionally, as shown in table 1, a protocol type may be one of the Intermediate System to Intermediate System Routing Protocol (IS-IS), the Open Shortest Path First (OSPF) protocol, the Direct (direct routing) protocol, the Static (static routing) protocol, or the BGP. Certainly, protocols of these several types are used an example herein for description, and it does not indicate that a protocol type of a node in this embodiment can be only these several protocols.

TABLE 1

| Protocol type identifier | Protocol name |
| --- | --- |
| 0 | other protocols |
| 1 | IS-IS of Level 1 |
| 2 | IS-IS of Level 2 |
| 3 | OSPF |
| 4 | Direct |
| 5 | Static |
| 6 | BGP |

In addition, optionally, the BGP session information of the first forwarder may include interface address information of the first forwarder for establishing a BGP session, interface address information of the second forwarder that establishes the BGP session with the first forwarder, the Route-ID of the second forwarder, and the AS number of an AS to which the second forwarder belongs. The BGP session information of the second forwarder includes interface address information of the second forwarder for establishing a BGP session, interface address information of the first forwarder that establishes the BGP session with the second forwarder, the AS number of an AS to which the first forwarder belongs, and the Route-ID of the first forwarder. Optionally, the BGP session information may further include one or more of an address family identifier AFI/subsequent address family identifier SAFI, an Route Reflector (RR) mark, or a next-hop-local mark. Specifically, optionally, the Route-ID may be an Internet Protocol Version 4 (IPV4) address or an Internet Protocol Version 6 (IPV6) address. Certainly, the IPV4 and the IPV6 protocols are used as an example herein for description, but this embodiment is not limited thereto. The AFI is used to indicate a route type, the SAFI is used to indicate a propagation type, the RR mark is used to indicate that an RR is on one end of a link described in link description information, and the next-hop-local mark is used to indicate that a next node of data transmission is a local node.

Referring to table 2 and table 3, table 2 shows content included in node information, and table 3 shows content included in BGP session information. Certainly, table 2 and table 3 are only forms of exemplarily describing the node information and the BGP session information, and it does not indicate that this embodiment is limited thereto.

TABLE 2

| Type | Subfield | Numerical value |
| --- | --- | --- |
| Protocol type identifier | None | 6 |
| ... | | |
| Node information | AS number | X |
| | Route-ID | 1.1.1.1 |

With reference to the protocol type identifier in table 1, in table 2, that the protocol type is 6 indicates that the node uses the BGP protocol, and that the AS number is X indicates that the node belongs to the autonomous system X.

TABLE 3

| Type | Subfield | Numerical value |
| --- | --- | --- |
| Protocol type identifier | None | 6 |
| ... | | |
| Information about a local node | AS number | X |
| | Route-ID | 3.3.3.3 |
| Information about a remote node | AS number | X |
| | Route-ID | 1.1.1.1 |
| BGP session information | Interface address of the local node | 3.3.3.3 |
| | Interface address of the remote node | 1.1.1.1 |
| | AFI/SAFI | AFI = 1 and SAFI = 4 |
| | Next-hop-local mark | Enable |

Referring to content in table 3, optionally, the first forwarder may be a local node, and the second forwarder is a remote node; or the first forwarder is a remote node, and the second forwarder is a local node.

With reference to the protocol type identifier in table 1, in table 3, that the protocol type identifier is 6 indicates that a protocol used by the node is the BGP protocol; an AS number of the local node and an AS number of the remote node are both identifiers X, that is, the local node and the remote node both belong to the autonomous system X; AFI=1 indicates that an internet protocol used by the link is the IPV4, SAFI=4 indicates that a manner for the link to propagate data is multicast, and that a next-hop-local-node mark is Enable indicates that the next hop of the link is a local node.

103: The controller generates a BGP logical topology between the first forwarder and the second forwarder according to the node information of the first forwarder, the BGP session information of the first forwarder, the node information of the second forwarder, and the BGP session information of the second forwarder, where the BGP logical topology between the first forwarder and the second forwarder includes a BGP session relationship between the first forwarder and the second forwarder.

Specifically, the controller generates the BGP logical topology between the first forwarder and the second forwarder according to the node information of the first forwarder, the BGP session information of the first forwarder, the node information of the second forwarder, and the BGP session information of the second forwarder. The BGP logical topology between the first forwarder and the second forwarder includes the BGP session relationship between the first forwarder and the second forwarder.

Specifically, when determining that both the BGP session information of the first forwarder and the BGP session information of the second forwarder include the Route-ID of the second forwarder, the controller determines that the second forwarder and the first forwarder establish a BGP session; when determining that the autonomous system number of an autonomous system to which the first forwarder belongs and the autonomous system number of an autonomous system to which the second forwarder belongs are the same, the controller determines that a type of the BGP session established by the first forwarder and the second forwarder is an IBGP session; and when determining that the autonomous system number of an autonomous system to which the first forwarder belongs and the autonomous system number of an autonomous system to which the second forwarder belongs are different, the controller determines that the type of the BGP session established by the first forwarder and the second forwarder is an EBGP session. The controller establishes a BGP session correspondence between the first forwarder and the second forwarder according to the Route-ID and the autonomous system number of the first forwarder, the BGP session information of the first forwarder, the Route-ID and the autonomous system number of the second forwarder, and the BGP session information of the second forwarder, so as to form the BGP logical topology between the first forwarder and the second forwarder. Then, the controller may learn the BGP session information between the first forwarder and the second forwarder. In the foregoing manner for obtaining the BGP logical topology between the first forwarder and the second forwarder, the controller may further obtain BGP session information among all forwarders in a network managed by the controller, and generate a BGP logical topology among all forwarders running the BGP protocol in the network, which is favorable for the controller to perform BGP session management and maintenance on the forwarders running the BGP protocol.

Figure 4:
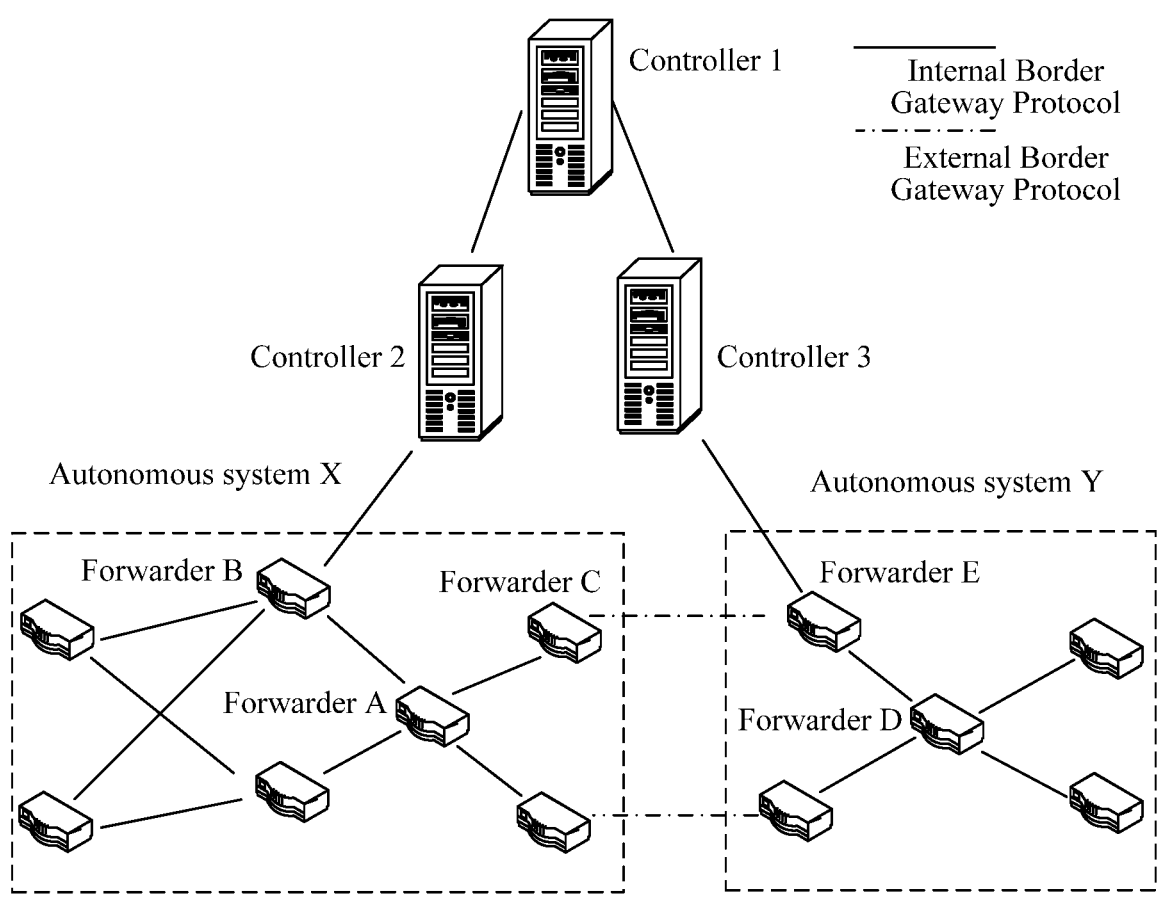
FIG. 4 is a schematic structural diagram of still another network system according to an embodiment of the present invention.

Certainly, the BGP logical topology generation method provided in the present invention may also be applied to a network system including multiple network nodes. As shown in FIG. 4, the network system may be a Seamless Multi-Protocol Label Switching (Seamless MPLS) network, including an autonomous system X and an autonomous system Y. A controller 1 may be a main controller (Main Controller), and the controller 1 manages the autonomous system X and the autonomous system Y by means of a controller 2 and a controller 3. The controller 2 may be a Mobile Backhaul Controller (MBH Controller). The controller 2 may obtain node information and BGP session information of each forwarder in the autonomous system X by means of a communication channel established with a forwarder B. The controller 3 may be a core controller (Core Controller), and the controller 3 may obtain node information and BGP session information of each forwarder in the autonomous system Y by means of a communication channel established with a forwarder E; or the controller 2 and the controller 3 obtain node information and BGP session information of each forwarder by means of a communication channel established with each forwarder in the autonomous system X and the autonomous system Y. Specifically, a forwarder A may be an Access Gateway Route Reflector (AG-RR), a forwarder C and the forwarder E may be Autonomous System Border Router (ASBR), and a forwarder D may be a Core Network Route Reflector (CN-RR).

For specific content of the node information and BGP session information of each forwarder, refer to description of step 101 in the embodiment corresponding to FIG. 1, and details are not described herein. In the network system shown in FIG. 4, the forwarder A and the forwarder B are in a same autonomous system, and the node information of the forwarder A and the node information of the forwarder B have a same autonomous system number. Therefore, a type of a BGP session established by the forwarder A and the forwarder B is an IBGP session, and other forwarders in the autonomous system X may also establish an IBGP session with each other. The forwarder B and the forwarder C are located in different autonomous systems, and the node information of the forwarder B and the node information of the forwarder C have different autonomous system numbers. Therefore, a type of a BGP session established by the forwarder B and the forwarder C is an EBGP session, and forwarders respectively located in the autonomous system X and the autonomous system Y may also establish an EBGP session with each other. The controller 1 may obtain a BGP logical topology among the forwarder A, the forwarder B, the forwarder C, the forwarder D, and the forwarder E by referring to the method of FIG. 1.

In the BGP logical topology generation method provided in this embodiment, a controller establishes a control channel with a forwarder, then obtains node information of a first forwarder and BGP session information of the first forwarder, obtains node information of a second forwarder and BGP session information of the second forwarder, and generates a BGP logical topology between the first forwarder and the second forwarder. The method can implement collection of a BGP logical topology between forwarders by the controller, which is favorable for the controller to manage forwarders running the BGP protocol.

Figure 5:
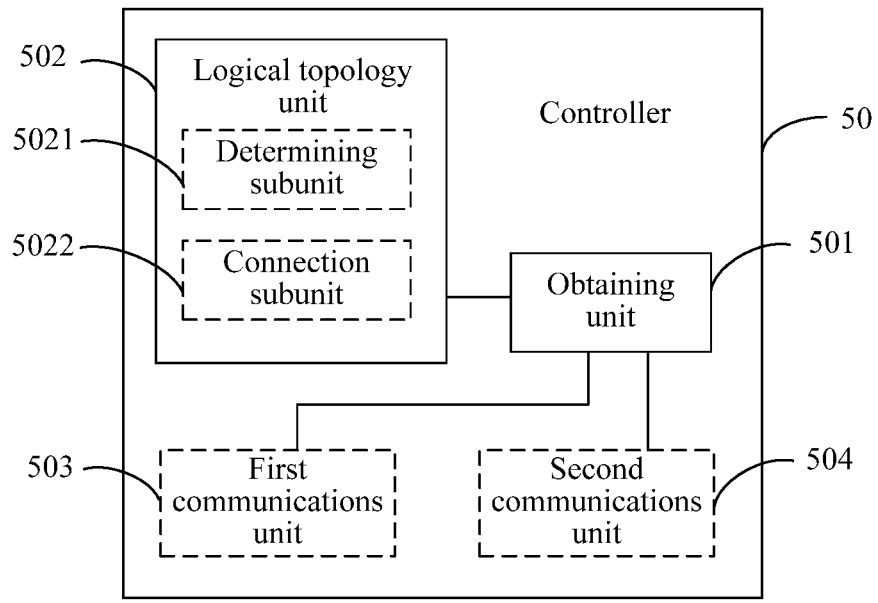
FIG. 5 is a schematic structural diagram of a controller according to an embodiment of the present invention.

With reference to the foregoing embodiment corresponding to FIG. 1, an embodiment of the present invention provides a controller. The controller may be configured to perform the method described in the foregoing embodiment corresponding to FIG. 1, and is applied to a network system in which control and forwarding are separated. The network system includes the controller, a first forwarder, and a second forwarder, and a BGP session is established between the first forwarder and the second forwarder. Referring to FIG. 5, the controller 50 includes: an obtaining unit 501 and a logical topology unit 502.

The obtaining unit 501 is configured to obtain node information of the first forwarder and BGP session information of the first forwarder, and obtain node information of the second forwarder and BGP session information of the second forwarder, where the node information of the first forwarder includes a BGP Route-ID of the first forwarder and an autonomous system number of an autonomous system to which the first forwarder belongs, and the node information of the second forwarder includes a BGP Route- ID of the second forwarder and an autonomous system number of an autonomous system to which the second forwarder belongs; and the logical topology unit 502 is configured to generate a BGP logical topology between the first forwarder and the second forwarder according to the node information of the first forwarder, the BGP session information of the first forwarder, the node information of the second forwarder, and the BGP session information of the second forwarder that are obtained by the obtaining unit 501, where the BGP logical topology between the first forwarder and the second forwarder includes a BGP session relationship between the first forwarder and the second forwarder.

Optionally, the BGP session information of the first forwarder includes interface address information of the first forwarder for establishing a BGP session, interface address information of the second forwarder that establishes the BGP session with the first forwarder, the autonomous system number of an autonomous system to which the second forwarder belongs, and the Route-ID of the second forwarder.

The BGP session information of the second forwarder includes interface address information of the second forwarder for establishing a BGP session, interface address information of the first forwarder that establishes the BGP session with the second forwarder, the autonomous system number of an autonomous system to which the first forwarder belongs, and the Route-ID of the first forwarder.

Specifically, optionally, the logical topology unit 502 includes: a determining subunit 5021 and a connection subunit 5022.

The determining subunit 5021 is configured to: when determining that both the BGP session information of the first forwarder and the BGP session information of the second forwarder include the Route-ID of the second forwarder, determine that the second forwarder and the first forwarder establish a BGP session.

The connection subunit 5022 is configured to establish a BGP session correspondence between the first forwarder and the second forwarder according to the node information of the first forwarder, the BGP session information of the first forwarder, the node information of the second forwarder, and the BGP session information of the second forwarder, so as to form a BGP logical topology between the first forwarder and the second forwarder.

Optionally, in an application scenario, the controller 50 further includes a first communications unit 503.

The first communications unit 503 is configured to establish a first communication channel with the first forwarder based on the OpenFlow protocol or the Diameter protocol.

The obtaining unit 501 is further configured to obtain the node information of the first forwarder and the BGP session information of the first forwarder by means of the first communication channel that is established by the first communications unit 503.

Further optionally, the first forwarder and the second forwarder belong to a same autonomous system, and the first forwarder stores the node information of the second forwarder and the BGP session information of the second forwarder.

The obtaining unit is further configured to obtain the node information of the second forwarder and the BGP session information of the second forwarder by means of the first communication channel that is established with the first forwarder.

Optionally, in another application scenario, the controller 50 further includes a second communications unit 504.

The second communications unit 504 is configured to establish a second communication channel with the second forwarder based on the OpenFlow protocol or the Diameter protocol.

The obtaining unit 501 is further configured to obtain the node information of the second forwarder and the BGP session information of the second forwarder by means of the second communication channel that is established by the second communications unit 504.

This embodiment provides a controller. The controller establishes a control channel with a forwarder, obtains node information of a first forwarder and BGP session information of the first forwarder, obtains node information of a second forwarder and BGP session information of the second forwarder, and generates a BGP logical topology between the first forwarder and the second forwarder. The controller can implement collection of a BGP logical topology between forwarders by the controller, which is favorable for the controller to manage forwarders running the BGP protocol.

Figure 6:
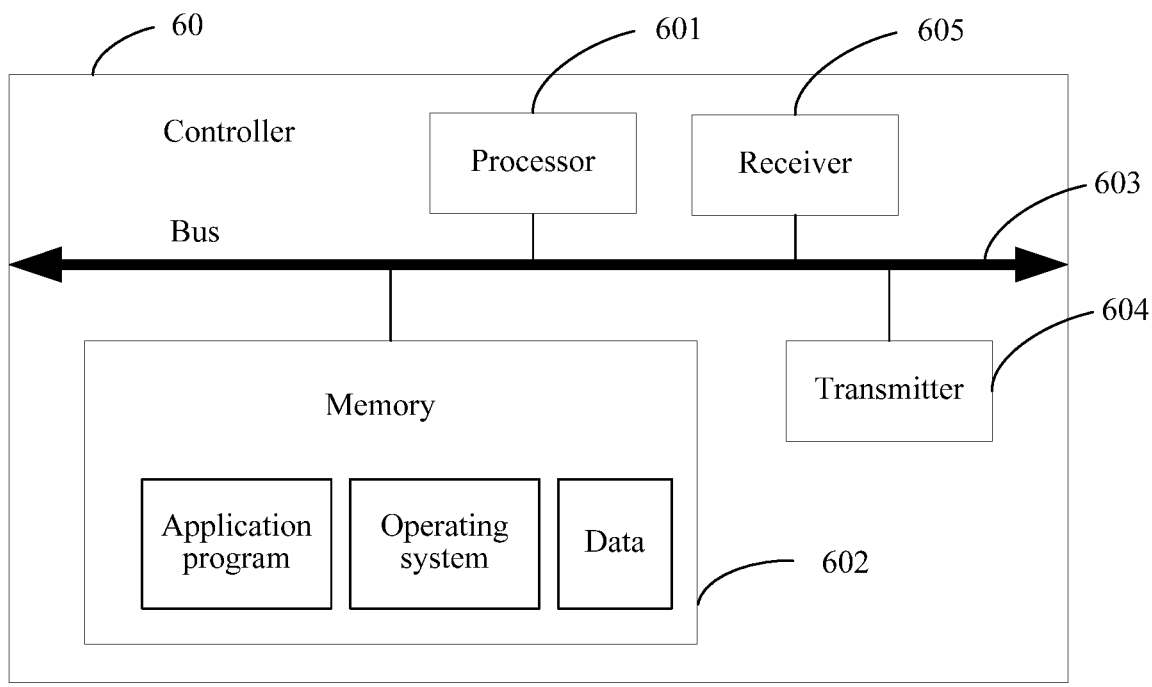
FIG. 6 is a schematic structural diagram of a controller according to another embodiment of the present invention.

Another embodiment of the present invention provides a controller 60, and the controller may be configured to perform the method described in the foregoing embodiment corresponding to FIG. 1. Referring to FIG. 6, the device may be built in or may be a micro-processing computer, for example, a general-purpose computer, a customized computer, or a portable device such as a mobile phone terminal or a tablet computer. The controller 60 includes at least one processor 601, a memory 602, a bus 603, a transmitter 604, and a receiver 605. The at least one processor 601, the memory 602, the transmitter 604, and the receiver 605 are connected by using the bus 603 and complete communication between each other.

The bus 603 may be an Industry Standard Architecture (ISA) bus, a Peripheral Component Interconnect (PCI) bus, an Extended Industry Standard Architecture, (EISA) bus, or the like. The bus 603 may be an address bus, a data bus, a control bus, or the like. For ease of representation, the bus in FIG. 6 is represented by using only one bold line, but it does not indicate that there is only one bus or only one type of bus.

The memory 602 is configured to execute application program code of the solution of the present invention, where the executed application program code of the solution of the present invention is stored in the memory, and is controlled by the processor 601 to be executed.

The memory may be a read-only memory ROM or another type of static storage device that can store static information and an instruction, or a random access memory RAM or another type of dynamic storage device that can store information and an instruction, and may also be an electrically erasable programmable read-only memory EEPROM, a compact disc read-only memory CD-ROM or other optical disk storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and can be accessed by a computer, but the present invention is not limited thereto. These memories are connected to the processor by using the bus.

The processor 601 may be a Central Processing Unit (CPU) or an Application Specific Integrated Circuit (ASIC), or may be one or more integrated circuits configured to implement the embodiments of the present invention.

The processor 601 is configured to invoke the program code in the memory 602 to perform operations of the obtaining unit and the logical topology unit in the foregoing device embodiment corresponding to FIG. 5. For specific descriptions, refer to the device embodiment corresponding to FIG. 5, and details are not described herein again.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. Examples of the computer-readable medium include but are not limited to: a Random Access Memory (RAM), a Read-Only Memory (ROM), an Electrically Erasable Programmable Read-Only Memory (EEPROM), a Compact Disc Read-Only Memory (CD-ROM) or other optical disc storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a Digital Subscriber Line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention include a Compact Disc (CD), a laser disc, an optical disc, a Digital Versatile Disc (DVD), a floppy disk and a Blu-ray disc. The disk generally copies data by a magnetic means, and the disc copies data optically by a laser means. The foregoing combination should also be included in the protection scope of the computer-readable medium.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of Border Gateway Protocol (BGP) topology generation, comprising:
   obtaining, by a controller, node information of a first forwarder and BGP session information of the first forwarder;
   obtaining, by the controller, node information of a second forwarder and BGP session information of the second forwarder, wherein the BGP session information of the first forwarder and the BGP session information of the second forwarder are associated with a BGP session between the first forwarder and the second forwarder; and
   generating, by the controller, a BGP topology based on the node information of the first forwarder, the BGP session information of the first forwarder, the node information of the second forwarder, and the BGP session information of the second forwarder, wherein the BGP topology comprises a BGP session relationship between the first forwarder and the second forwarder.

2. The method according to claim 1, wherein the BGP session information of the first forwarder comprises interface address information of the first forwarder for establishing the BGP session, interface address information of the second forwarder that establishes the BGP session with the first forwarder, an autonomous system number of an autonomous system associated with the second forwarder, and a BGP Route Identifier (Route-ID) of the second forwarder, and wherein the BGP session information of the second forwarder comprises interface address information of the second forwarder for establishing the BGP session, interface address information of the first forwarder that establishes the BGP session with the second forwarder, an autonomous system number of an autonomous system associated with the first forwarder, and a BGP Route-ID of the first forwarder.

3. The method according to claim 1, wherein the node information of the first forwarder comprises a BGP route identifier (Route-ID) of the first forwarder and an autonomous system number of an autonomous system associated with the first forwarder, and wherein the node information of the second forwarder comprises a BGP Route-ID of the second forwarder and an autonomous system number of an autonomous system associated with the second forwarder.

4. The method according to claim 1, wherein a type of the BGP session established by the first forwarder and the second forwarder is an Internal Border Gateway Protocol (IBGP) session when an autonomous system number of an autonomous system associated with the first forwarder and an autonomous system number of an autonomous system associated with the second forwarder are a same value, and wherein the type of the BGP session established by the first forwarder and the second forwarder is an External Border Gateway Protocol (EBGP) session when the autonomous system number of the autonomous system associated with the first forwarder and the autonomous system number of the autonomous system associated with the second forwarder are a different value.

5. The method according to claim 1, wherein before obtaining node information of the first forwarder and BGP session information of the first forwarder, the method further comprises:
   establishing, by the controller, a first communication channel with the first forwarder; and
   obtaining, by the controller, the node information of the first forwarder and the BGP session information of the first forwarder via the first communication channel.

6. The method according to claim 5, wherein the first forwarder and the second forwarder are associated with a same autonomous system, wherein the node information of the second forwarder and the BGP session information of the second forwarder are stored at the first forwarder, and wherein the method further comprises obtaining, by the controller, the node information of the second forwarder and the BGP session information of the second forwarder via the first communication channel.

7. The method according to claim 1, the method further comprising obtaining, by the controller, a route reflector (RR) mark from the first forwarder, wherein the RR mark indicates the first forwarder is a RR.

8. The method according to claim 1, the method further comprising obtaining, by the controller, a next-hop-local-node mark from the first forwarder, wherein the next-hoplocal-node mark indicates the first forwarder is a next hop of data transmission from the second forwarder to the first forwarder.

9. A controller comprising:
a memory comprising instructions; and
a processor coupled to the memory and configured to execute the instructions to:
obtain node information of a first forwarder and Border Gateway Protocol (BGP) session information of the first forwarder;
obtain node information of a second forwarder and BGP session information of the second forwarder, wherein the BGP session information of the first forwarder and the BGP session information of the second forwarder are associated with a BGP session between the first forwarder and the second forwarder; and
generate a BGP topology between the first forwarder and the second forwarder based on the node information of the first forwarder, the BGP session information of the first forwarder, the node information of the second forwarder, and the BGP session information of the second forwarder, wherein the BGP topology between the first forwarder and the second forwarder comprises a BGP session relationship between the first forwarder and the second forwarder.

10. The controller according to claim 9, wherein the BGP session information of the first forwarder comprises interface address information of the first forwarder for establishing a BGP session, interface address information of the second forwarder that establishes the BGP session with the first forwarder, an autonomous system number of an autonomous system associated with the second forwarder, and a BGP Route Identifier (Route-ID) of the second forwarder, and wherein the BGP session information of the second forwarder comprises interface address information of the second forwarder for establishing the BGP session, interface address information of the first forwarder that establishes the BGP session with the second forwarder, an autonomous system number of an autonomous system associated with the first forwarder, and a BGP Route-ID of the first forwarder.

11. The controller according to claim 9, wherein the node information of the first forwarder comprises a BGP route identifier (Route-ID) of the first forwarder and an autonomous system number of an autonomous system associated with the first forwarder, and wherein the node information of the second forwarder comprises a BGP Route-ID of the second forwarder and an autonomous system number of an autonomous system associated with the second forwarder.

12. The controller according to claim 9, wherein a type of the BGP session established by the first forwarder and the second forwarder is an Internal Border Gateway Protocol (IBGP) session when an autonomous system number of an autonomous system associated with the first forwarder and an autonomous system number of an autonomous system associated with the second forwarder are a same value, and wherein the type of the BGP session established by the first forwarder and the second forwarder is an External Border Gateway Protocol (EBGP) session when an autonomous system number of an autonomous system associated with the first forwarder and an autonomous system number of an autonomous system associated with the second forwarder are different.

13. The controller according to claim 9, wherein the processor is further configured to:

establish a first communication channel with the first forwarder; and
obtain the node information of the first forwarder and the BGP session information of the first forwarder via the first communication channel.

14. The controller according to claim 13, wherein the first forwarder and the second forwarder are associated with a same autonomous system, wherein the node information of the second forwarder and the BGP session information of the second forwarder are stored at the first forwarder, and wherein the processor is further configured to obtain the node information of the second forwarder and the BGP session information of the second forwarder via the first communication channel.

15. The controller according to claim 9, wherein the processor is further configured to obtain a route reflector (RR) mark from the first forwarder, wherein the RR mark indicates the first forwarder is the RR.

16. The controller according to claim 9, wherein the processor is further configured to obtain a next-hop-local-node mark from the first forwarder, wherein the next-hop-local-node mark indicates the first forwarder is a next hop of data transmission from the second forwarder to the first forwarder.

17. A method of Border Gateway Protocol (BGP) topology generation, comprising:
establishing, by a first forwarder, a BGP session between the first forwarder and a second forwarder; and
sending, by the first forwarder, node information of the first forwarder and BGP session information of the first forwarder to a controller, wherein the BGP session information of the first forwarder is associated with the BGP session, wherein the node information of the first forwarder and the BGP session information of the first forwarder support generation of the BGP topology at the controller, and wherein the BGP topology comprises a BGP session relationship between the first forwarder and the second forwarder.

18. The method according to claim 17, wherein the BGP session information of the first forwarder comprises interface address information of the first forwarder for establishing the BGP session, interface address information of the second forwarder for establishing the BGP session with the first forwarder, an autonomous system number of an autonomous system associated with the second forwarder, and a BGP Route Identifier (Route-ID) of the second forwarder.

19. The method according to claim 17, wherein the node information of the first forwarder comprises a BGP route identifier (Route-ID) of the first forwarder and an autonomous system number of an autonomous system associated with the first forwarder.

20. The method according to claim 17, the method further comprising sending, by the first forwarder, a route reflector (RR) mark to the controller, wherein the RR mark indicates the first forwarder is a RR.

21. The method according to claim 17, the method further comprising sending, by the first forwarder, a next-hop-local-node mark to the controller, wherein the next-hop-local-node mark indicates the first forwarder is a next hop of data transmission from the second forwarder to the first forwarder.

22. A first forwarder comprising:
a memory comprising instructions; and
a processor coupled to the memory and configured to execute the instructions to:

establish a Border Gateway Protocol (BGP) session between the first forwarder and a second forwarder; and send node information of the first forwarder and BGP session information of the first forwarder to a controller, wherein the BGP session information of the first forwarder is associated with the BGP session, wherein the node information of the first forwarder and the BGP session information of the first forwarder support generation of a BGP topology at the controller, and wherein the BGP topology comprises a BGP session relationship between the first forwarder and the second forwarder.

23. The first forwarder according to claim 22, wherein the BGP session information of the first forwarder comprises interface address information of the first forwarder for establishing the BGP session, interface address information of the second forwarder for establishing the BGP session with the first forwarder, an autonomous system number of an autonomous system associated with the second forwarder, and a BGP Route Identifier (Route-ID) of the second forwarder.

24. The first forwarder according to claim 22, wherein the node information of the first forwarder comprises a BGP route identifier (Route-ID) of the first forwarder and an autonomous system number of an autonomous system associated with the first forwarder.

25. The first forwarder according to claim 22, wherein the processor is further configured to send a route reflector (RR) mark to the controller, wherein the RR mark indicates the first forwarder is a RR.

26. The first forwarder according to claim 22, wherein the processor is further configured to send a next-hop-local-node mark to the controller, wherein the next-hop-local-node mark indicates the first forwarder is a next hop of data transmission from the second forwarder to the first forwarder.

27. A network system in which control and forwarding are separated, the network system comprising:
a first forwarder;
a second forwarder in communication with the first forwarder through a Border Gateway Protocol (BGP) session; and
a controller configured to:
obtain node information of the first forwarder and BGP session information of the first forwarder;
obtain node information of the second forwarder and BGP session information of the second forwarder, wherein the BGP session information of the first forwarder and the BGP session information of the second forwarder are associated with a BGP session between the first forwarder and the second forwarder; and
generate a BGP topology between the first forwarder and the second forwarder based on the node information of the first forwarder, the BGP session information of the first forwarder, the node information of the second forwarder, and the BGP session information of the second forwarder, wherein the BGP topology between the first forwarder and the second forwarder comprises a BGP session relationship between the first forwarder and the second forwarder.

28. The network system according to claim 27, wherein the BGP session information of the first forwarder comprises interface address information of the first forwarder for establishing the BGP session, interface address information of the second forwarder for establishing the BGP session with the first forwarder, an autonomous system number of an autonomous system associated with the second forwarder, and a BGP Route Identifier (Route-ID) of the second forwarder, and wherein the BGP session information of the second forwarder comprises interface address information of the second forwarder for establishing the BGP session, interface address information of the first forwarder for establishing the BGP session with the second forwarder, an autonomous system number of an autonomous system associated with the first forwarder, and a BGP Route-ID of the first forwarder.

29. The network system according to claim 27, wherein the node information of the first forwarder comprises a BGP route identifier (Route-ID) of the first forwarder and an autonomous system number of an autonomous system associated with the first forwarder, and wherein the node information of the second forwarder comprises a BGP Route-ID of the second forwarder and an autonomous system number of an autonomous system associated with the second forwarder.

30. The network system according to claim 27, wherein the controller is further configured to obtain a route reflector (RR) mark from the first forwarder, wherein the RR mark indicates the first forwarder is a RR.

31. The network system according to claim 27, wherein the controller is further configured to obtain a next-hop-local-node mark from the first forwarder, wherein the next-hop-local-node mark indicates the first forwarder is a next hop of data transmission from the second forwarder to the first forwarder.

32. A non-transitory computer-readable storage medium storing executable instructions, wherein when the instructions are executed by a computer, the instructions cause the computer to:
establish a Border Gateway Protocol (BGP) session between a first forwarder and a second forwarder; and
send node information of the first forwarder and BGP session information of the first forwarder to a controller, wherein the BGP session information of the first forwarder is associated with the BGP session, wherein the node information of the first forwarder and the BGP session information of the first forwarder support generation of a BGP topology at the controller, and wherein the BGP topology comprises a BGP session relationship between the first forwarder and the second forwarder.

33. The non-transitory computer-readable storage medium according to claim 32, wherein the BGP session information of the first forwarder comprises interface address information of the first forwarder for establishing the BGP session, interface address information of the second forwarder for establishing the BGP session with the first forwarder, an autonomous system number of an autonomous system associated with the second forwarder, and a BGP Route Identifier (Route-ID) of the second forwarder.

34. The non-transitory computer-readable storage medium according to claim 32, wherein the node information of the first forwarder comprises a BGP route identifier (Route-ID) of the first forwarder and an autonomous system number of an autonomous system associated with the first forwarder.

35. The non-transitory computer-readable storage medium according to claim 32, wherein the instructions, when executed, further cause the computer to send a route reflector (RR) mark to the controller, wherein the RR mark indicates the first forwarder is a RR.

36. The non-transitory computer-readable storage medium according to claim 32, wherein the instructions, when executed, further cause the computer to send a next-hop-local-node mark to the controller, wherein the next-hop-local-node mark indicates the first forwarder is a next hop of data transmission from the second forwarder to the first forwarder.

\* \* \* \* \*